United States Patent [19]
Findley, Jr. et al.

[11] Patent Number: 5,979,773
[45] Date of Patent: *Nov. 9, 1999

[54] DUAL SMART CARD ACCESS CONTROL ELECTRONIC DATA STORAGE AND RETRIEVAL SYSTEM AND METHODS

[75] Inventors: Raymond Findley, Jr.; Robert Dixon, both of Marietta, Ga.

[73] Assignee: American Card Technology, Inc., Marietta, Ga.

[*] Notice: This patent is subject to a terminal disclaimer.

[21] Appl. No.: 08/854,534

[22] Filed: May 12, 1997

Related U.S. Application Data

[63] Continuation-in-part of application No. 08/383,937, Feb. 6, 1995, Pat. No. 5,629,508, which is a continuation of application No. 08/352,837, Dec. 2, 1994, abandoned.

[51] Int. Cl.⁶ ............................ G06K 19/06; G06K 5/00
[52] U.S. Cl. ............................ 235/492; 235/380
[58] Field of Search .................... 235/380, 375, 235/382, 492, 487; 233/900; 380/3, 4, 23

[56] References Cited

U.S. PATENT DOCUMENTS 5,629,508  5/1997  Findley, Jr. et al. .............. 235/380

*Primary Examiner*—Thien Minh Le
*Attorney, Agent, or Firm*—Shoemaker and Mattare, Ltd.

[57] ABSTRACT

The present invention pertains to an electronic data access and retrieval system comprising at least first and second smart cards, a first card being encoded with digital data fields representative of predetermined information and a second card including authorization codes for enabling access to and authorized retrieval of selected information from digital data fields of the first card, and includes computer means including display means for displaying the access data. A method is also disclosed of operating an electronic secured access verification display system for displaying an indication of permissible and non-permissible access to a facility of authorized personnel and for verifying the identity of such personnel by providing IDENTITY SMART CARDS, one for each authorized person, and an ACCESS SMART CARD to each authorized operator of the system.

2 Claims, 13 Drawing Sheets

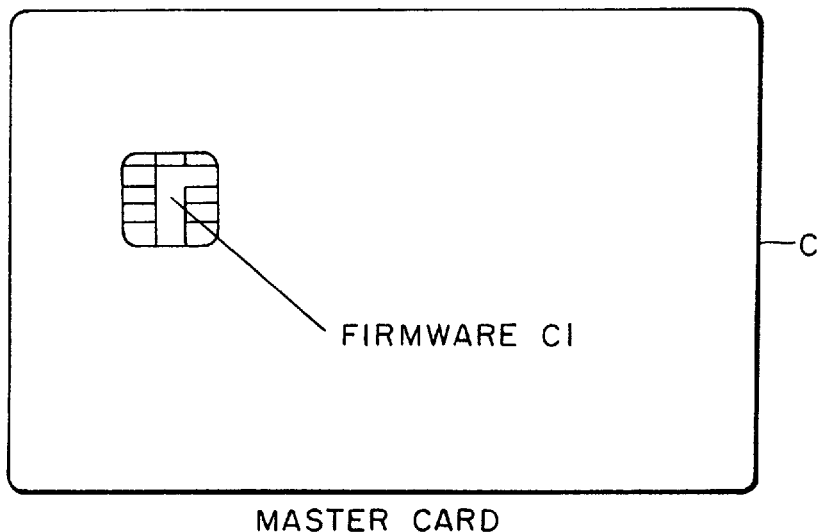
FIG. 5C — MASTER CARD (FIRMWARE C1)
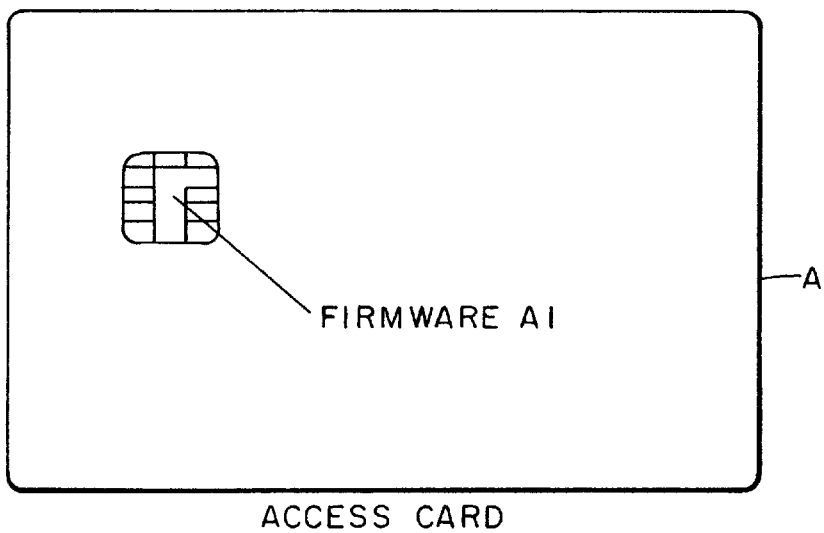
FIG. 5A — ACCESS CARD (FIRMWARE A1)
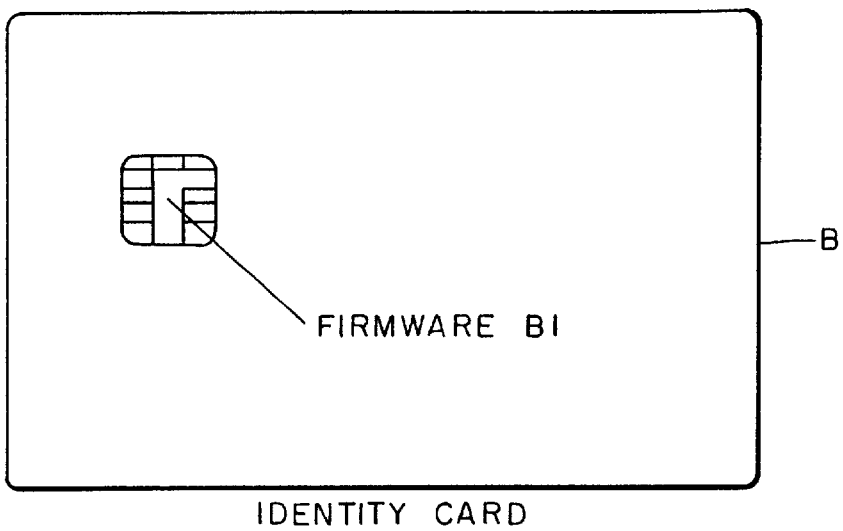
FIG. 5B — IDENTITY CARD (FIRMWARE B1)

ISSUE LICENSE CARD

DUAL SMART CARD ACCESS CONTROL ELECTRONIC DATA STORAGE AND RETRIEVAL SYSTEM AND METHODS

This application is a continuation-in-part of U.S. patent application Ser. No. 08/383,937, now U.S. Pat. No. 5,629,508 filed Feb. 6, 1995; which is a continuation of U.S. patent application Ser. No. 08/352,837, filed Dec. 2, 1994, now abandoned.

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

INCORPORATION BY REFERENCE

The software utilized in the system and methods of the invention has been registered in the U.S. Copyright Office under Copyright Registration No. TX 3-639-032, which includes "Microsoft Access" under Microsoft License Agreement. The registered deposit for this copyright registration is available to the public for inspection and copy at the U.S. Copyright Office. Applicants and their Assignee hereby incorporate herein by reference said copyrighted software (non-patent publication).

FIELD OF THE INVENTION

It is most advantageous to have an automatic system and methods for identifying people or personnel and providing secured access to a facility of authorized personnel upon verifying the identity of such personnel. What is clearly needed is a means of, and methods for, providing automatic, rapid and positive verification of persons who previously have been authorized access to secured areas.

The present invention system and methods have various market applications, one being a race track facility operation having various types of employees and participants, such as pari-mutuel employees, gaming employees, jockeys, animal owners (thoroughbred, greyhound, etc.), and others, and it is desirous to license these people so that you can control their respective access to various respective secured areas of the race track facility.

Accordingly, the present invention provides methods of operating an electronic secured access verification display system for displaying an indication of permissible and non-permissible to a facility of authorized personnel and for verifying the identity of such personnel, comprising the steps of:

a) providing a plurality of IDENTITY smart cards, one for each authorized person, each encoded with at least one field of digital data representative of personal identity and including official information and a digitized photograph indicative of each authorized person;

b) providing an ACCESS smart card to each authorized operator of the system, each ACCESS card at least being encoded with control data elements mandatory to operate the system to display permissible and non-permissible access to the facility of each authorized person having an IDENTITY smart card indicative of the identity of each authorized person and optionally containing at least one field of digital data which in turn can be accessed by at least one other access card in a hierarchy; and c) inserting into the display system an ACCESS smart card and one of the plurality of IDENTITY smart cards to display permissible and non-permissible access to the facility, or optionally, providing access permissibility in a PC or PROM enabling reading of at least one field of digital data from the inserted card.

Furthermore, the following method steps are also incorporated into the invention:

a) upon the occurrence of insertion into the system of both the ACCESS card and the IDENTITY card, electronically reading the ACCESS card or the enabled system and determining which fields of data of the IDENTITY card are to be displayed, reading such determined fields of data from the IDENTITY card and displaying the determined fields of data of the IDENTITY card;

b) determining if the IDENTITY card inserted into the system is allowed access to the facility by comparing secured area assignment data contained in the ACCESS card or enabled system with secured area assignment data contained within the IDENTITY card; and c) displaying permissible access and non-permissible access messages dependent upon verifying both the identity of the IDENTITY card holder and the acceptance of the IDENTITY card by the ACCESS card or enabled system by the authorized operator of the system.

The method invention further includes the step of encoding each ACCESS card with authorization codes for enabling retrieval of selected data field information from the IDENTITY card.

In the method described, an access smart card may be programmed to also function as an identity card with data fields which can be accessed by yet another "access" card. This sequence can be extended so that a hierarchy can be established which permits access to lower level access cards and even first level identity-only cards. The functions of each card can be multiple.

Likewise, at any point in the hierarchy established, the function of a single or even a plurality of access cards may be performed by a PC disk drive or PROM device. The use of local area network can therefore serve multiple user card readers. Also, the fact that a single card, whether a user card or access card or a multiple function access/user card, can contain multiple data fields accessible only by preselected hierarchal access present either on a card or on a PC disk drive or PROM or EPROM permits layers of data to have different access criteria as well as general retrieval. Wherever the terms "access" and "identity" are used herein, this multiple functionality is optionally contemplated.

Greater flexibility can be incorporated into the hierarchy by enabling preselected access functionality to add to or modify the data fields of lower members of the hierarchy. For example, in a two card system, an access card can be enabled to write to user/identity cards. Access functionality in a PC or PROM whether or not in a local area network can also be programmed to write to different layers of information on a single card or multiplicity of cards at one or different hierarchal levels.

The dual card access control functionality can be accomplished with the use of a single reader, whereas the access card must be inserted, read and accepted by the system prior to the insertion of the identity card. Without a valid access card, the identity card is useless.

The user card may be comprised of non-I.C. cards, i.e., memory cards, optical cards, magnetic stripe cards, bar codes and multiple dimension bar codes, etc.

The access smart card may, in certain situations, be concealed in a device, i.e., inside a kiosk or inside a manned or unmanned point-of-sale terminal. The function of the access card does not change, but provides additional security and read/write access to the pertinent data on the user/identity card, regardless of whether or not an operator is present.

Smart cards offer the user or issuer a safe method for maintaining one or more portable databases in offline systems. The contents of the databases can be secured in a number of different ways, depending on the value of this information to the card issuer, card holder and/or system sponsor. This "value" can only be determined once the use of the card is known. The more uses the card accommodates, the more valuable the information contained on the card is likely to be.

Smart cards are used to store and/or process information. The types of information stored on smart cards and how that data is used generally defines the application that the card is being used to accommodate. For example, in a stored value application, the information maintained by the card is monetary value. In a loyalty application, the information could be points redeemable for gifts or prizes. If the application is to secure physical access to a building or plant location, the information is the exact location where the card allows or denies access. Information types must be known before their value can be assessed.

Information types can be designated as read only, add only, limited access and no access information. "Read only" information is fixed like printed words on a piece of paper, allowing anyone to read it but preventing any manipulation of the information. "Add only" means as long as room exists, more information can be written to the card but no information can be removed. This is like engraving pictures or words on a stone. "Limited access" is data that can be modified or erased, like writing on a blackboard. This also implies that as long as sufficient "room" exists, data can be added. Finally, "no access" is information that can never be revealed but is needed by the smart card in order to process the data in the way designated by the application developer.

Smart cards allow information to be freely distributed yet only accessed by people who are authorized. This ensures that only authorized people get access to certain information held in smart cards. For example, the first card is issued by the System Sponsor to employees or agents of the sponsor. This card is called the Supervisor or Access Card. The second card is given to users of the system and is called the User/Identity Card. The data on the User Card can only be read and/or manipulated when the appropriate Access Card is present. Otherwise, the User Card remains in an inactive state and is useless to the user. Without the appropriate and authorized Access Card, the data held in the User/Identity Card is inaccessible.

The Access Card is tailored to the information requirements of the system sponsor for each application implemented in the system. For example, a medical application requires a specific Access Card in order to update and/or append information to the User Card's data file. Likewise, the employer's Access Card would be required in order to access information on the Employee's Identification or User's Card. Multiple employee databases stored on the employee's Identification Card requires different employer issued Access Cards for the employer to make inquires.

Multiple applications running on smart card technologies is a function of the requirements of the system sponsor. If the sponsor elects to sell off various portions of the chip's directories, multiple applications can be programmed to most microprocessors of size 3K or better. Some multiple database applications can be run in EEPROM containing 1K of memory space. Running multiple applications is not only a function of the access processes or protection algorithms but is also a function of the business case for the card issue or system sponsor.

However, in cases where multiple applications reside on single smart card chips, the Dual Card process described herein serves to create firewalls between these applications. With this protection, the likelihood of issuing multiple application smart cards increases. The Dual Card process lowers the risk of privacy breaches or security fraud.

The Dual Card process supports a variety of security options including detachable, scaleable and moveable schemes. Each application can have different levels of security based on the application's predefined requirements. Access to any one database associated with any one application can be secured from other databases and/or applications residing on the User/Identity Card.

The Dual Card process can work with whichever type of security is desired by the sponsor. This includes RSA, DES, triple DES, or other cryptographic solutions in use with smart card technologies.

The Access Card can be programmed to control physical access to secure areas within a facility. Access Cards can also be used to control the addition, modification and/or deletion of applications as well as database information on User Cards. This can be accomplished on the fly, meaning the system operator can make these adjustments during normal User Card use. Access Cards can also be used to define data fields on User Cards, define access rights of operators or system sponsors to particular data fields on User Cards, create different levels of security between different applications or databases on User Cards, and accept downloaded audit trail information from User Cards.

Auditing is an important and unique capability of the Dual Card process. The Access Card can store transaction data. This data can be used for auditing purposes, and also may help detect and/or prevent fraud, depending on the application.

Access Cards can be made to expire and/or can be PIN/password protected. Depending on the application(s) or requirements of the system sponsor, Access Cards are issued under tightly controlled conditions. The Access Card remains unusable until the correct PIN is entered or, in the case where the card has expired, until the card is reactivated by following the correct operating procedures as determined by the system sponsor/operator.

The Dual Card process is important in the protection of cardholder privacy when multiple applications reside on the card. Since the system sponsor writes the rules for accessing information, cardholders are protected from groups attempting to access this information outside the policies adopted by the sponsor. Access Cards, specific to applications, create firewalls between each application preventing unauthorized access to information.

Multiple applications are programmed onto smart card technology in three situations:
1. multiple system sponsors agree to share the costs of card issuance and infrastructure improvements;
2. a single card issue or system sponsor has a business need for more than one application; or
3. a single card issuer or system sponsor acts as agent for multiple organizations interested in having the card perform certain applications. In this case, the system sponsor essentially sells off real estate on the chip to all and any interested customer(s).

Layering is a coined term to represent the multiple applications that can be stored in smart card chip directories.

Each directory stores an application database or layer, and each can maintain individual applications as demanded by the system sponsor. To access these directories requires the use of an authorized Access Card. Only the system sponsor (or the system operator under the direction of the system sponsor) can issue and authorize Access Cards to access these various databases. Layering therefore protects the User Card's database from viewing or access by unauthorized persons.

To reiterate, a long-felt need has existed to provide an electronic data access and retrieval system and a method for accessing and retrieving digital data information from persons by authorized operator/officials of a secured access facility, and for various other purposes. Accordingly, the present invention further provides an electronic data access and retrieval system comprising:
- at least first and second smart card means, a first card being encoded with digital data fields representative of predetermined information and second card means including authorization codes for enabling retrieval of selected information from the first card, the second card means can be a dedicated integrated circuit chip in a PC or EPROM;
- computer means including display means for displaying accessed data and having at least first and second smart card read/write means operatively connected to the computer means for reading data fields from and writing data fields to the first and second smart card means; and
- whereby when the first smart card is placed into the first read/write means and the second smart card communicates with the second read/write means, authorized retrieval of at least some of the data fields contained in the first card is enabled and displayed.

The inventive method of the above-referenced accessing and retrieving digital data information system comprises the steps of:
a) encoding a first smart card with at least one digital data field representative of predetermined information;
b) encoding a second smart card or a reader capable system with authorization codes for enabling authorized retrieval of one or more selected data fields of information from the first card;
c) electronically reading the authorization codes from the second smart card or reader enabled system and retrieving selected information from digital data fields contained in the first smart card; and
d) displaying the selected information.

The foregoing and other objects, features and advantages of the invention will be apparent from the following more detailed description of preferred embodiments and methods of the invention, as illustrated in the accompanying drawings. Throughout, where a read functionality is described, it is contemplated that "read" and/or "write" capability can be incorporated.

For the sake of brevity, a brief summary of the invention system and methods is presented hereinbefore and is not presented separately.

BRIEF DESCRIPTION OF THE DRAWINGS

FIGS. 5A, 5B and 5C graphically depict, in exemplary form, an ACCESS smart card A, an IDENTITY (License) smart card B, and a MASTER smart card C, each of which incorporate firmware shown a A1, B1 and C1, respectively.

FIG. 10 depicts, in graphic form, a dual-card IDENTITY smart card issue/update station, the updating function being almost identical to that of FIG. 7 except the system checks that the identity card has been written to.

DESCRIPTION OF INVENTION SYSTEM AND METHODS

The dual-card inventive concept of ACCESS cards and IDENTITY (License) cards are utilized in tandem to supply the functionality of the system.

Figure 1:
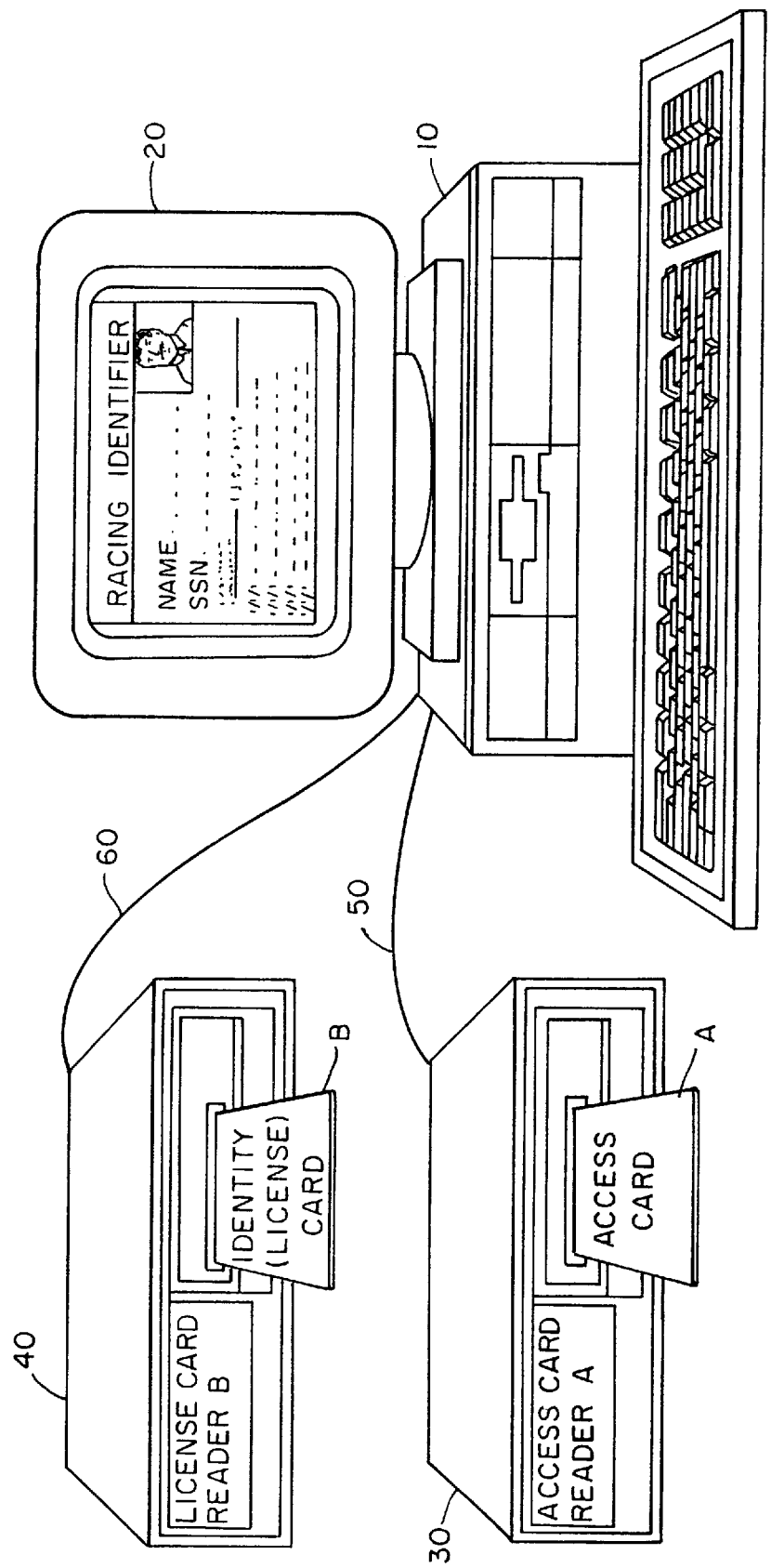
FIG. 1 shows one preferred embodiment of the system invention applicable to an authorized racing track operation.

FIG. 1 shows a preferred embodiment of the system invention applicable to an authorized racing track operation, wherein computer 10 includes a display 20, ACCESS card reader 30 for ACCESS card A is connected via communication link (line) to computer 10 via a parallel port means, and IDENTITY card reader 40 for IDENTITY card B is connected via communication link/line 60 to computer 10 via the parallel port means.

The system of a preferred embodiment constructed in accordance with the present invention and methods, and described with reference to the respective drawings, can be constructed from the following Table, which lists examples of the depicted components:

TABLE A

| COMPONENT | DESCRIPTION |
|---|---|
| PC Computer Stations 10 | Gateway 2000 486/dx2/66V having two RS-232 Serial Ports and a Parallel Port |
| Two 9600P Smart Card Readers 30 and 40 | News Datacm 9600P |
| ACCESS Smart Card A | Smart Card with Motorola SC-21 chip |
| IDENTITY Smart Card B | Smart Card with Motorola SC-11 chip |

The invention system and methods utilize smart card technology components which may be defined as a card component that incorporates an integrated circuit chip therein (IC chip) as set forth above with respect to ACCESS smart card A and IDENTITY smart card B. An accepted industry-wide definition of a "smart card" is a credit card size device/component containing an embedded microprocessor chip that stores information for retrieval, which information has previously been written therein. The ACCESS card A is the key to writing and reading all information stored in the IDENTITY card B. Without a suitable ACCESS card, updated information cannot be stored in the IDENTITY card and existing information is inaccessible. ACCESS cards are tailored to the information requirements of the individual issuing the IDENTITY cards and each operator of the system has an ACCESS card which determines which fields that operator is able to write to and read from the IDENTITY card, such card issuing procedures being described in further detail hereinafter, along with a MASTER card feature.

For each secured area access, a plurality of IDENTITY smart cards are issued, one for each authorized person, and each is encoded with digital data representative of personal identity and including official information and a digitized photograph indicative of each authorized person. Also, a photograph of the authorized person can be imprinted on or affixed to the face of an IDENTITY card.

An ACCESS smart card is issued to each authorized operator of the system station located at the secured access area and each ACCESS card is encoded with control data elements mandatory to operate the system station to display permissible and non-permissible access to the secured area of each authorized person having an IDENTITY card indicative of the identity of each authorized person. The ACCESS card A importantly includes authorization codes for enabling retrieval of selected information from a compatible IDENTITY card B.

When the ACCESS card is inserted into read/write component 30 and the IDENTITY card B is inserted into IDENTITY read/write component 40, and these cards are compatible with each other as to accessible fields of data, the authorized information is read from the IDENTITY card and displayed on display means 20. Depending on the type of accessible fields of data information, or profile, of an individual's ACCESS card, the user/holder of the ACCESS card can be limited to the fields of data that are to be written to or read from the IDENTITY card. The controlling "profile" resides in the ACCESS card. Thus, as shown in FIG. 1, compatible ACCESS and IDENTITY cards have been inserted into the respective readers and the system is enabled to retrieve selected information from the IDENTITY card that is displayed on display means 20.

One of the features of the system invention pertains to having an ACCESS card encoded with control data elements mandatory to operate the system station to display permissible and non-permissible access to a secured area. These control data elements of the card's operating system that reside in the ACCESS card are encoded data containing information on how to read and write to the IDENTITY card, which also allows activation of a set of instructions that can reside in the ACCESS card, in the hardware, in the software in the computer 10, or any combination thereof. A different ACCESS card will be able to read different data fields in an IDENTITY card if it is programmed to do so.

Figure 2:
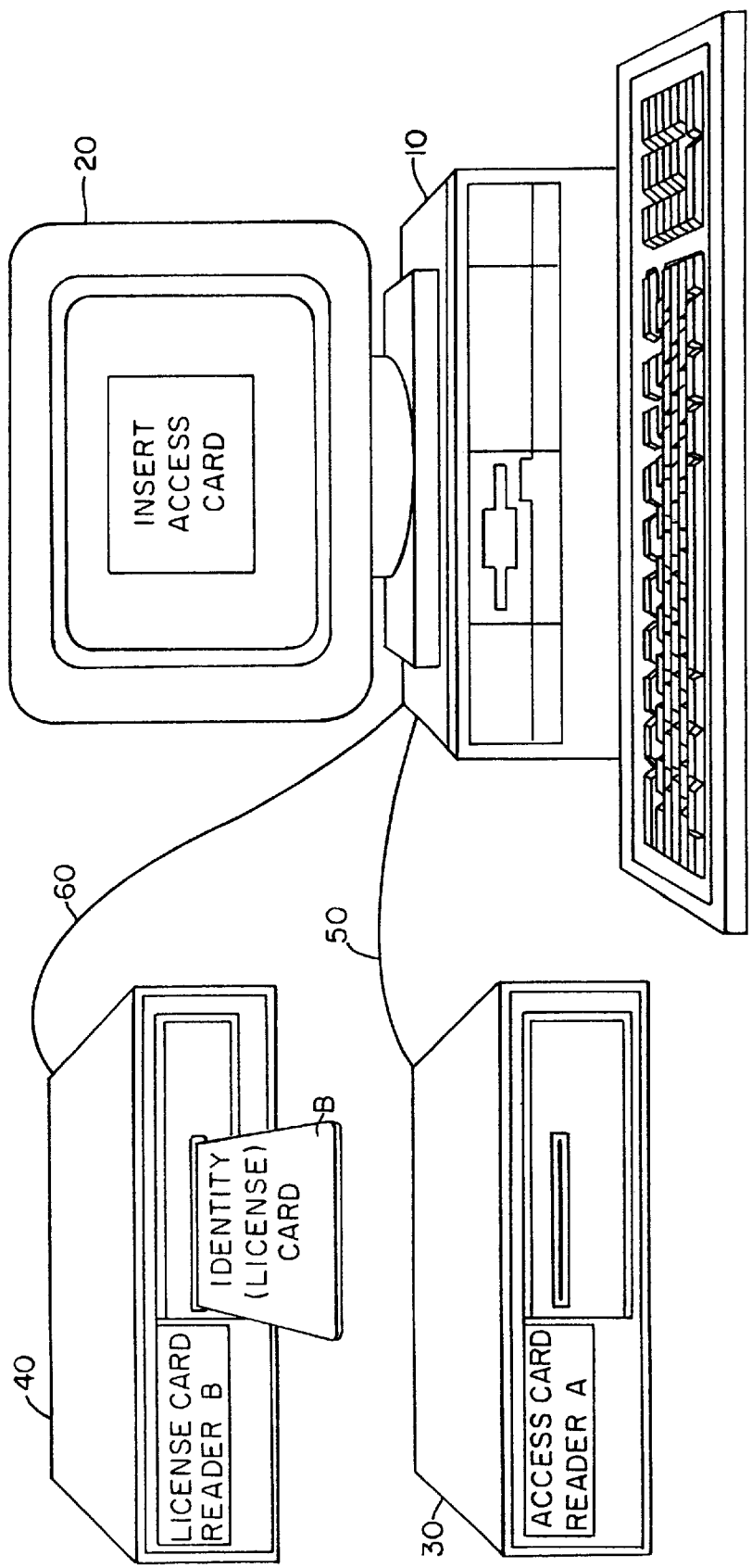
FIG. 2 depicts the FIG. 1 system which cannot be operatively enabled without the use of an ACCESS card.

Now with respect to FIG. 2, for each system operation a first attempt is made to read the ACCESS card; and, if no ACCESS card is inserted into the ACCESS card reader 30, then system operation is not enabled; thus, the information contained in the IDENTITY card cannot be read and displayed, and a display message of "insert ACCESS card" occurs on the display.

With the inventive system, the authorized operator of the computer 10 station located at the entrance to a secured access area is able to peruse personal or history data contained in the assigned data fields of the IDENTITY smart card. In the racing track application, the authorized operator can view information encoded on the IDENTITY card, which could include information as to the various states in which the holder of the IDENTITY card is licensed, as well as any penalty information that that person has received in regard to racing, and other information including date of birth, height, weight, address, etc., of the IDENTITY card holder.

Figure 3:
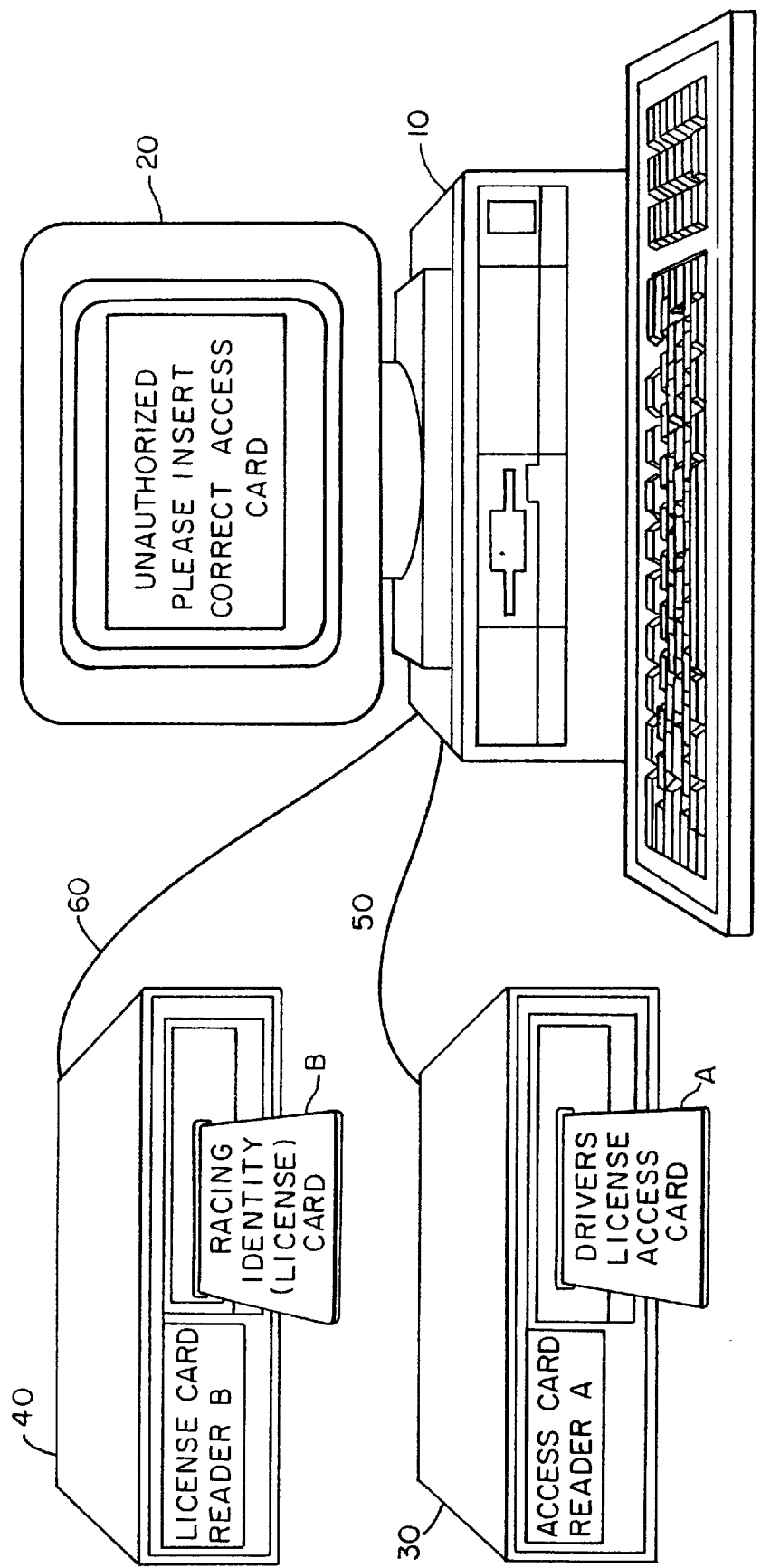
FIG. 3 illustrates a FIG. 1 system operation display message which occurs when an unauthorized ACCESS card is used with an authorized IDENTITY card.

FIG. 3 depicts a FIG. 1 system operation display message which occurs when an unauthorized ACCESS card is used with an authorized IDENTITY card. Accordingly, when the ACCESS card and IDENTITY card conflict, not matching correct fields, an error message appears describing the mismatch, and only inserting the matching cards allows activation of the system station.

Figure 4:
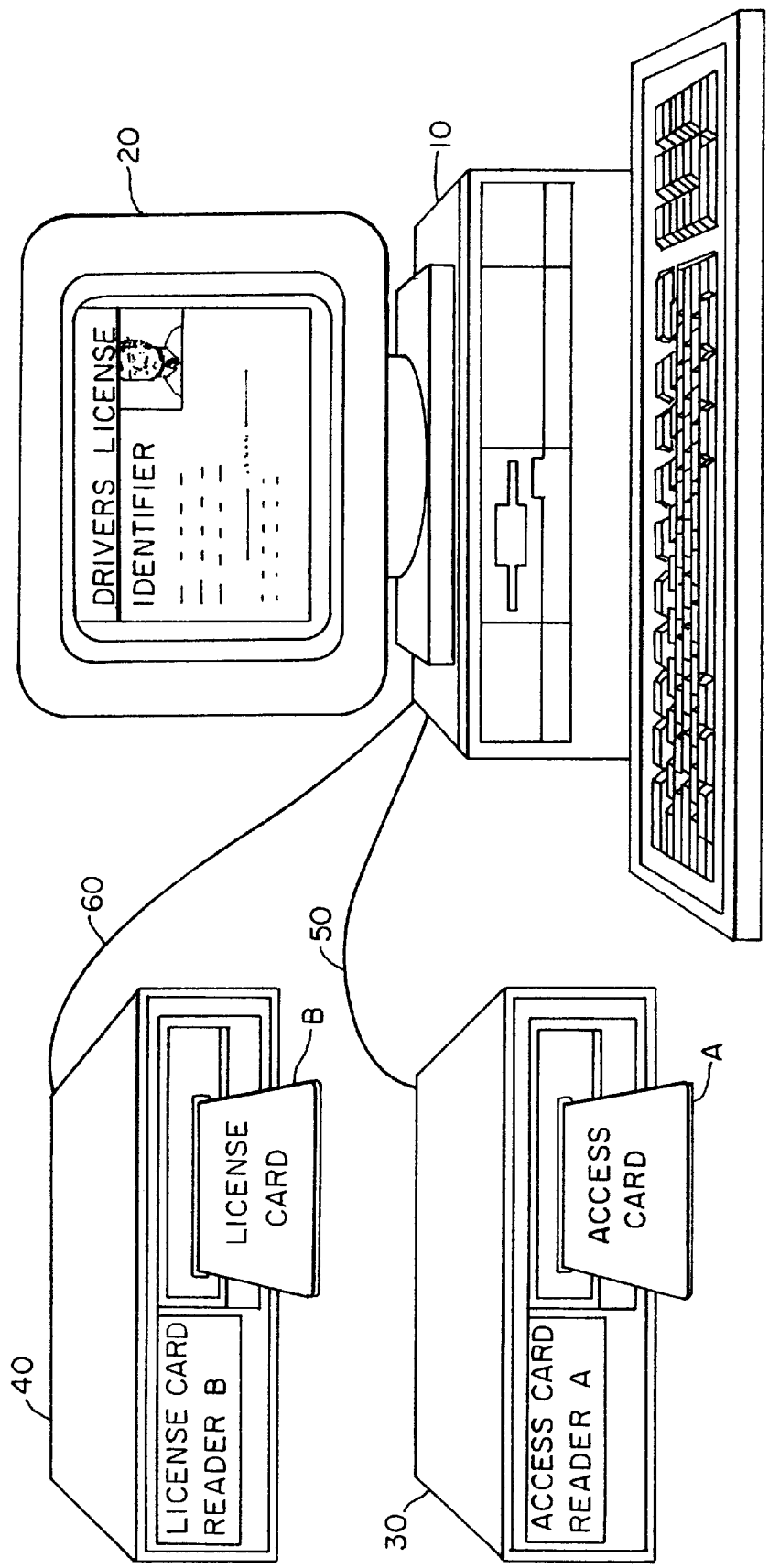
FIG. 4 shows a system embodiment applicable to an authorized Driver's License information access and retrieval operation.

FIG. 4 shows a system embodiment applicable to an authorized Driver's License information access and retrieval operation, another application of the present system and method. Thus, by changing and appropriately programming an ACCESS card means, the entire Card Operating System can be changed without any hardware modifications, which affords easy functionality and added capabilities.

Now with respect to FIG. 5, an exemplary showing of smart cards utilized in the present system and methods, each of the cards incorporate firmware A1, B1, and C1, respectively, for the ACCESS, IDENTITY and MASTER cards, the latter of which will be described hereinafter.

Figure 6:
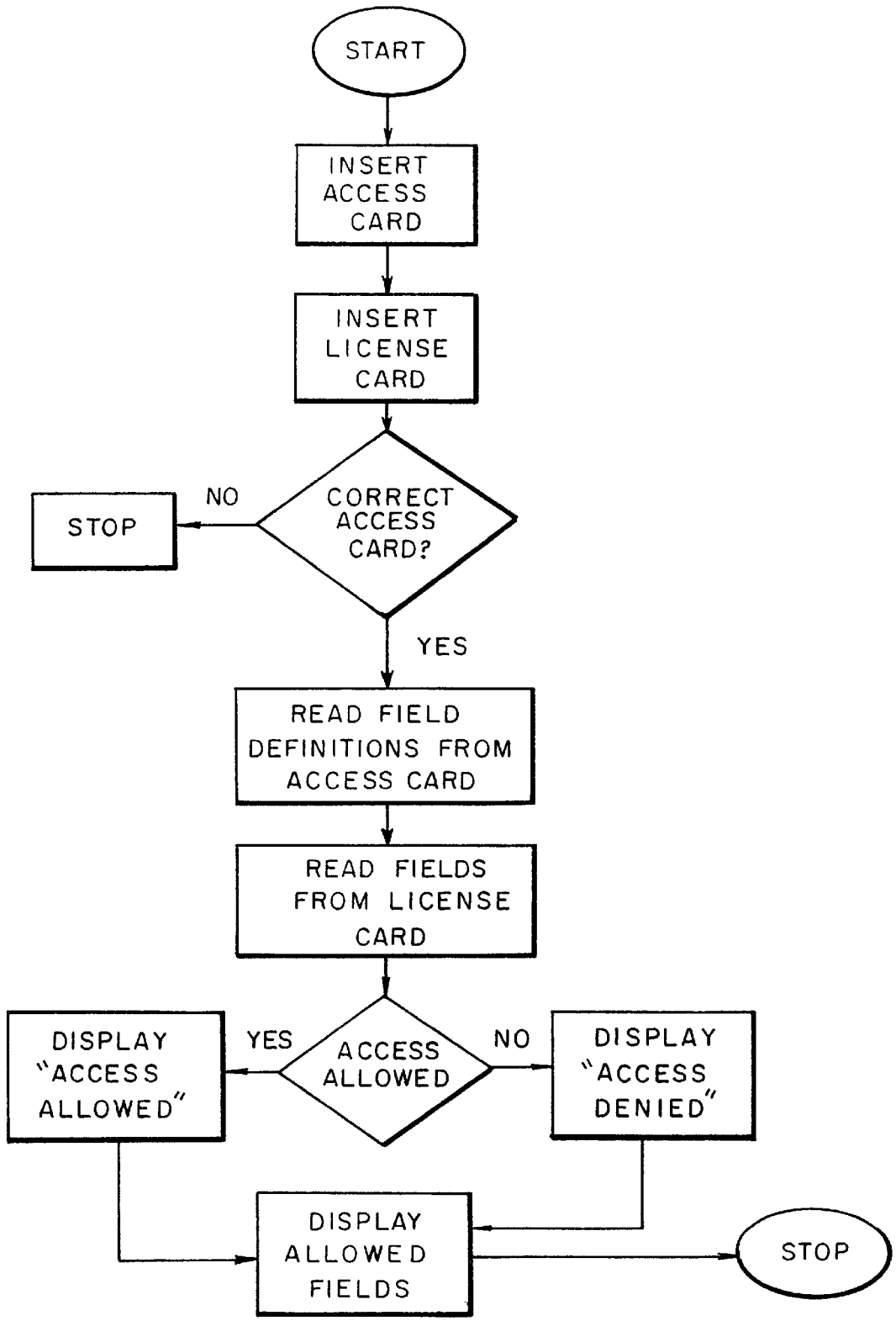
FIG. 6 is a flow chart diagram showing a system operation to display IDENTITY card data.

FIG. 6 provides disclosure of a flow chart diagram showing a system operation to display IDENTITY card data. As shown, an ACCESS card is inserted and an IDENTITY card is inserted, the ACCESS card is interrogated to be compatible or non-compatible with the inserted IDENTITY card, and, if compatible, field definitions and assignment and authorization code fields are read from the ACCESS card, an access decision is made and, if allowed, selected information from the digital data fields of the IDENTITY card are displayed.

Various advantages are created and are available within the invention system and methods, some of which are as follows.

ACCESS control cards permit or deny access to the data contained within an IDENTITY card. These parameters are established by the person who owns and/or administers the system. Dual-card access control allows an administrator graduations of authority to thereby provide various levels of security and access to various operators, employees, etc.

An individual's ACCESS card allows variable levels of security. This permits access to certain data stored on the card defined by the administrator. For example, a security guard may only see a picture for positive ID (identification) of an IDENTITY card holder and determines whether the individual card holder has permission to enter an area. However, the supervisor of a security guard may have a differently encoded ACCESS card with a higher level of security, which would allow the supervisor to view on the display not only the picture of the IDENTITY card holder and access permitted, but also a display may be obtained of an IDENTITY card holder's personal data, such as address, phone, rulings, etc., which are on file in the IDENTITY card data fields, all of this occurring when the supervisor places his particularly programmed ACCESS card into the invention system. Such capacity, therefore, satisfies various issues as to personal privacy, and this feature of the invention can thus provide a plurality of different ACCESS cards, each one of which may contain different levels of security access to the information contained within an IDENTITY card carried or worn by persons, employees, etc.

The invention system also allows the communication of messages through the system on a one-to-one or group basis, and a message list can specify which messages are to be displayed when an individual's IDENTITY card is inserted into the respective reader component.

From the foregoing, one can clearly imagine various other applications of the system and methods provided herein, such as licensing professionals, providing medical histories inclusive of allergy parameters for each card holder, patron tracking, and any other kind of licensing or personal history data information.

Figure 7:
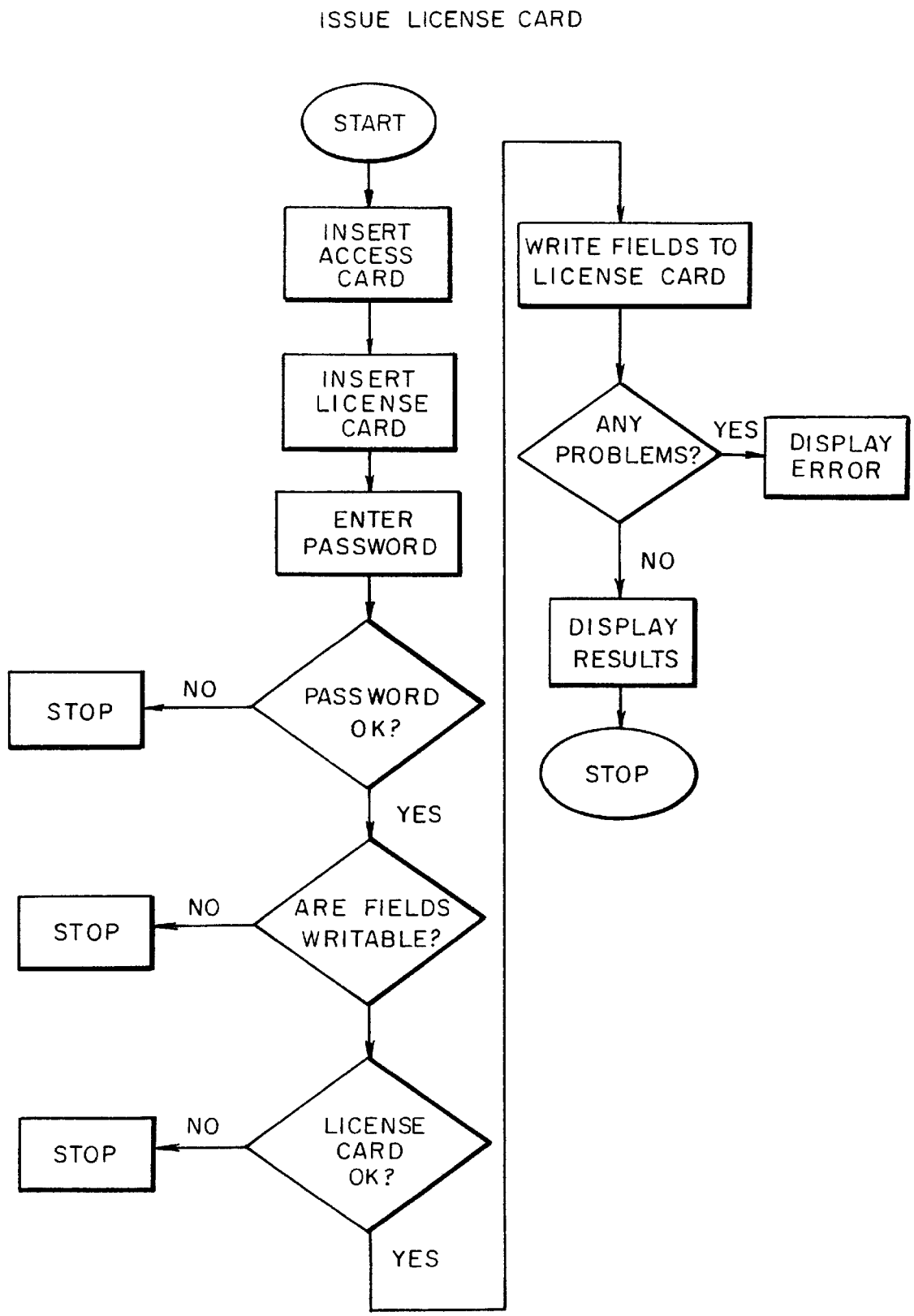
FIG. 7 is a flow chart diagram showing a system operation for issuing IDENTITY (License) cards.

FIG. 7 is a flow chart diagram showing a system operation for issuing IDENTITY (License) cards. As shown therein, an ACCESS card is used to issue a License card and, upon insertion of both cards, a password is entered and, if the password is acceptable, a query is made for "Are fields writeable?" and, if so, a decision is made as to the acceptance of the IDENTITY card and, if OK, data fields of information are written to the IDENTITY card, such being checked for any errors or problems; and, if yes, the error is displayed; and, if no, a display results and the operation is terminated.

Figure 8:
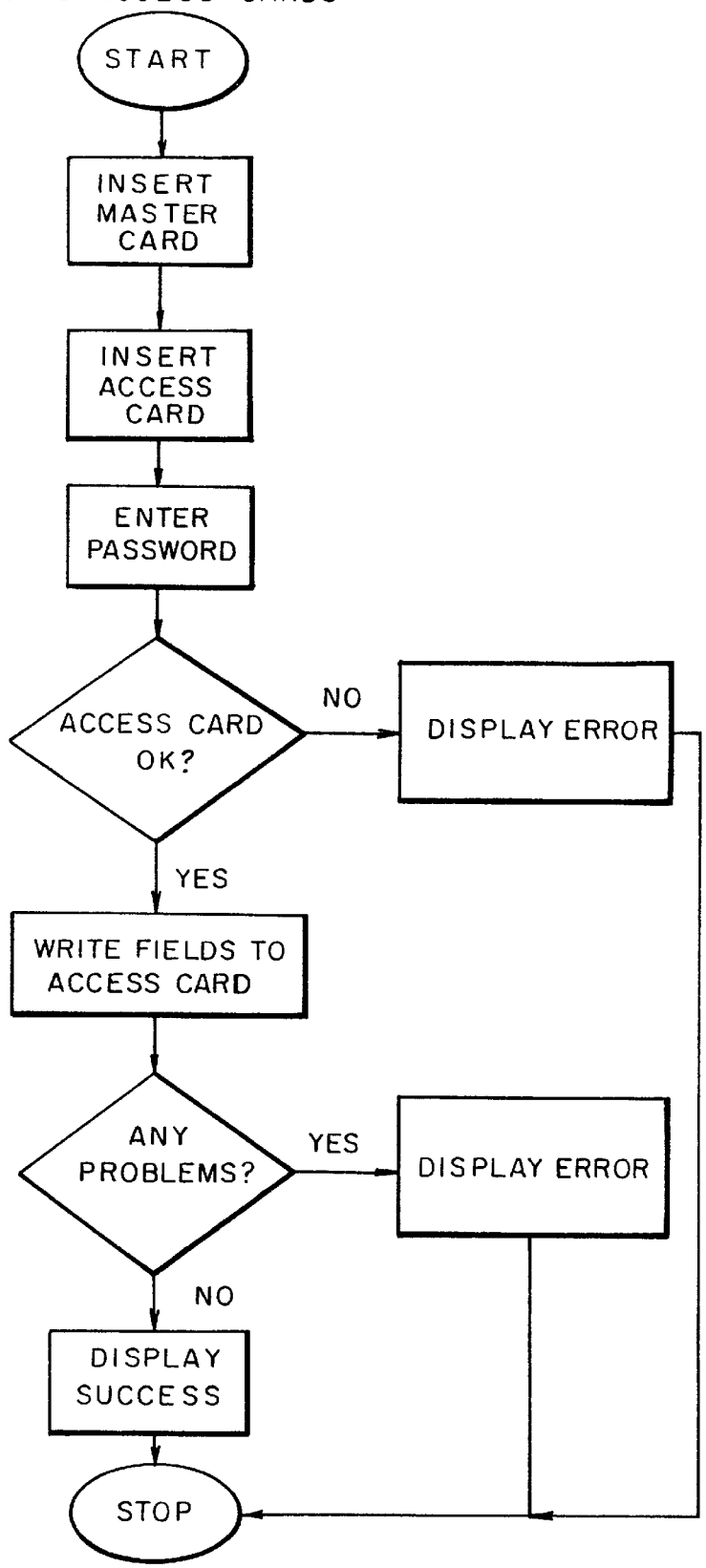
FIG. 8 is a flow chart diagram showing a system operation to issue ACCESS cards.

FIG. 8 depicts a flow chart diagram showing a system operation to issue ACCESS cards and, as shown, a MASTER card is utilized. The MASTER card contains information on how to program the ACCESS card and, without a MASTER card, no ACCESS cards can be issued. Accordingly, both the MASTER and ACCESS cards are inserted, an appropriate password is entered, a decision is made as to the acceptance of the ACCESS card, and, if not, a display error occurs, and if the ACCESS card is accepted, then data fields including authorization codes are written to the ACCESS card, where after the written fields are checked for error and, if yes, the error is displayed, and, if no problems are found, the display renders a successful message.

Figure 9:
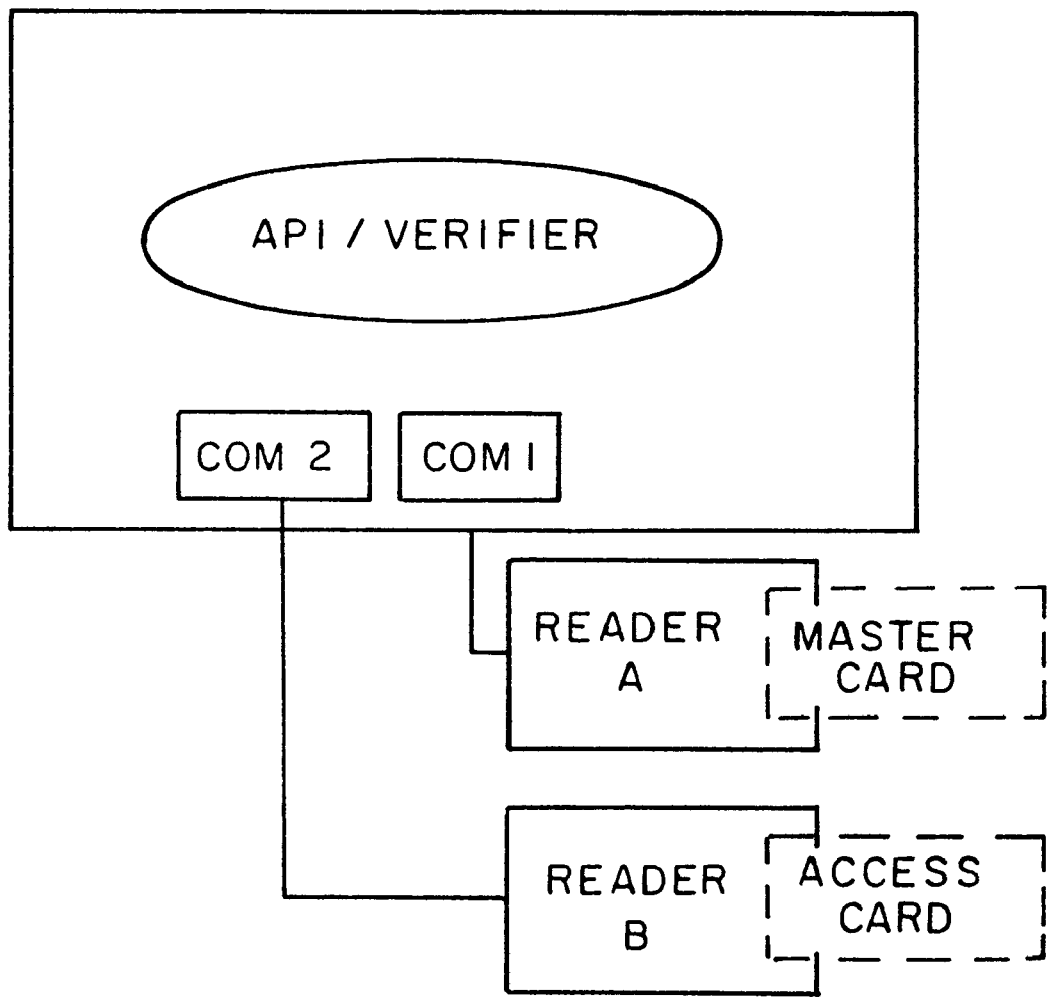
FIG. 9 depicts, in graphic form, a dual-card ACCESS smart card issuing station.

FIG. 9 depicts, in graphic form, a dual-card ACCESS smart card issuing station within which a system function of FIG. 8 is accomplished. As shown in FIG. 9, the MASTER card and ACCESS card are inserted into their respective reader components A and B, which are respectively connected to the COM1 and COM2 serial ports of computer 10. API/Verifier included in computer 10 represents "Application Programming Interface/Verifier" which constitutes software residing in the PC computer 10 for the Card Operating System.

Figure 10:
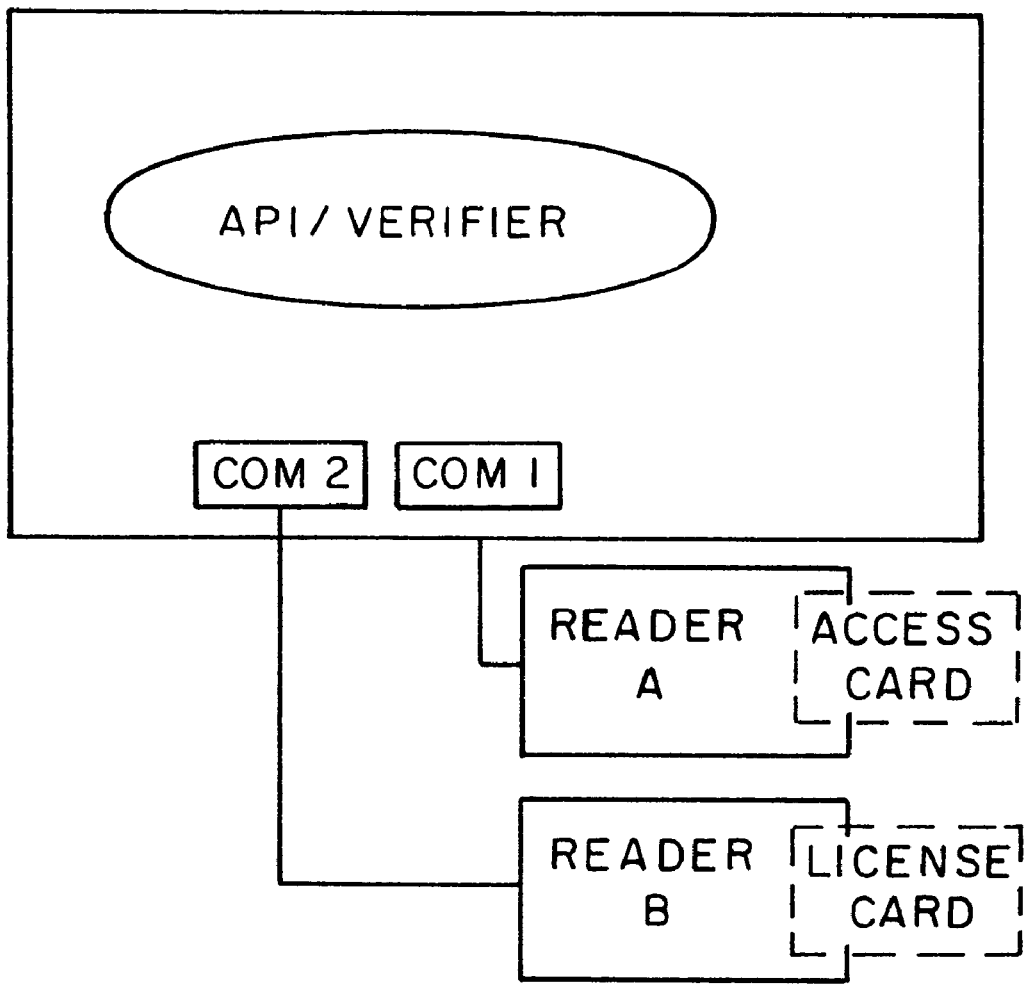
Figure 11:
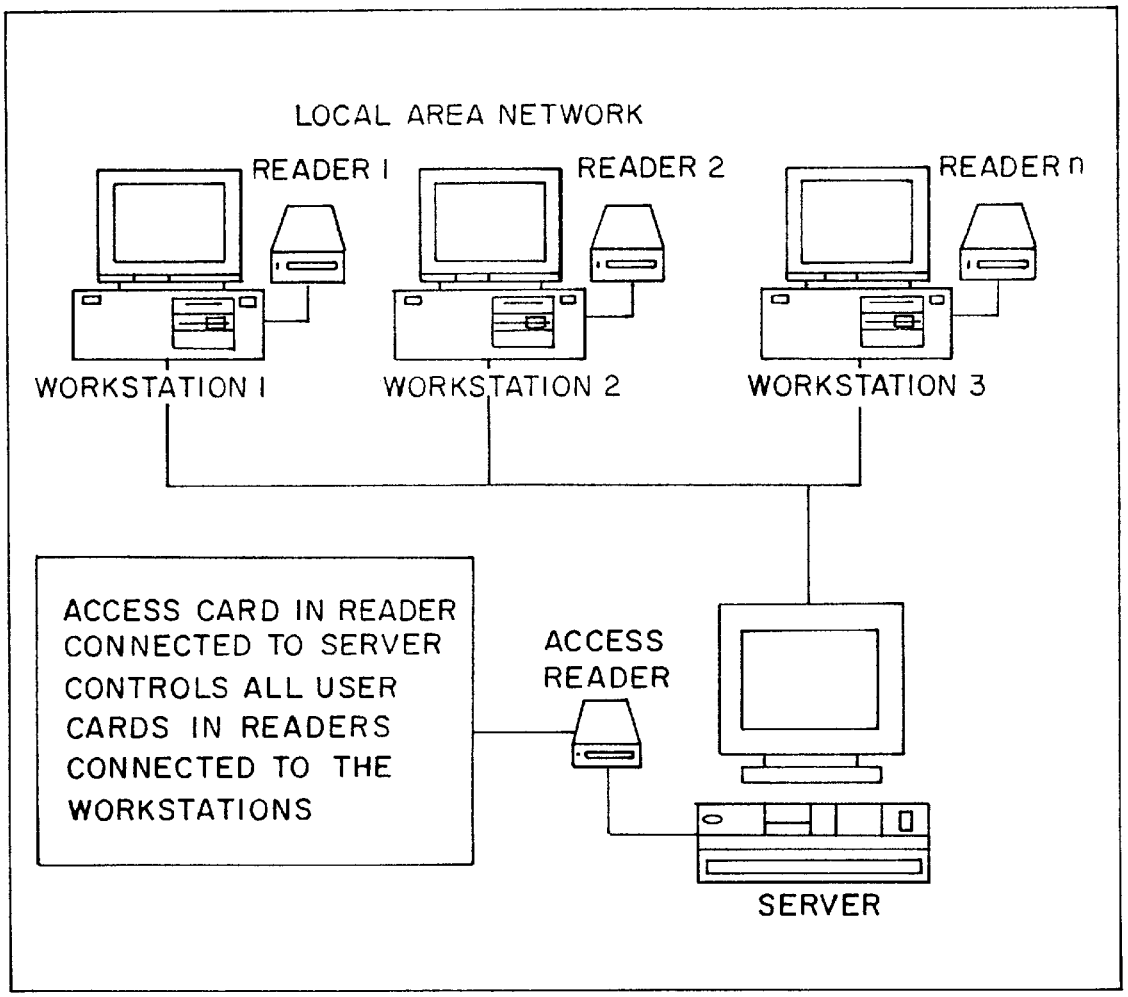
FIG. 11 depicts a single access card accessing a local area network.
Figure 12:
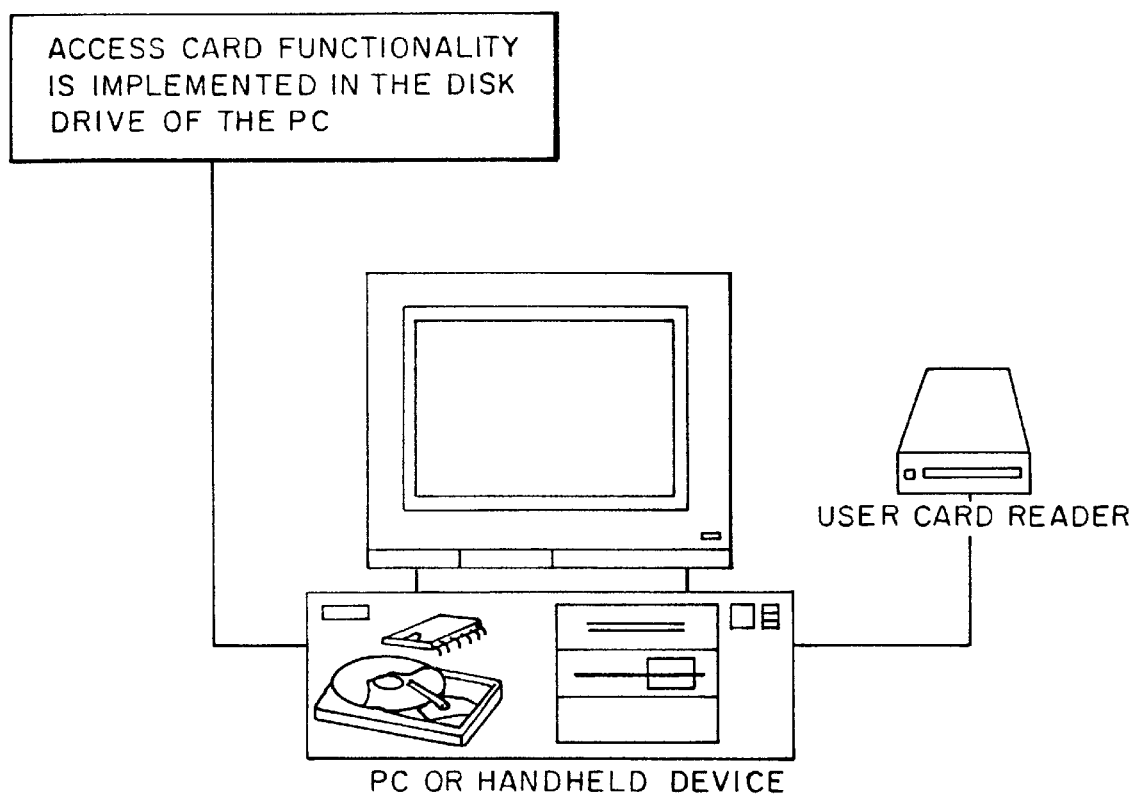
FIG. 12 depicts a PC or EPROM operating in an access modiality.
Figure 13:
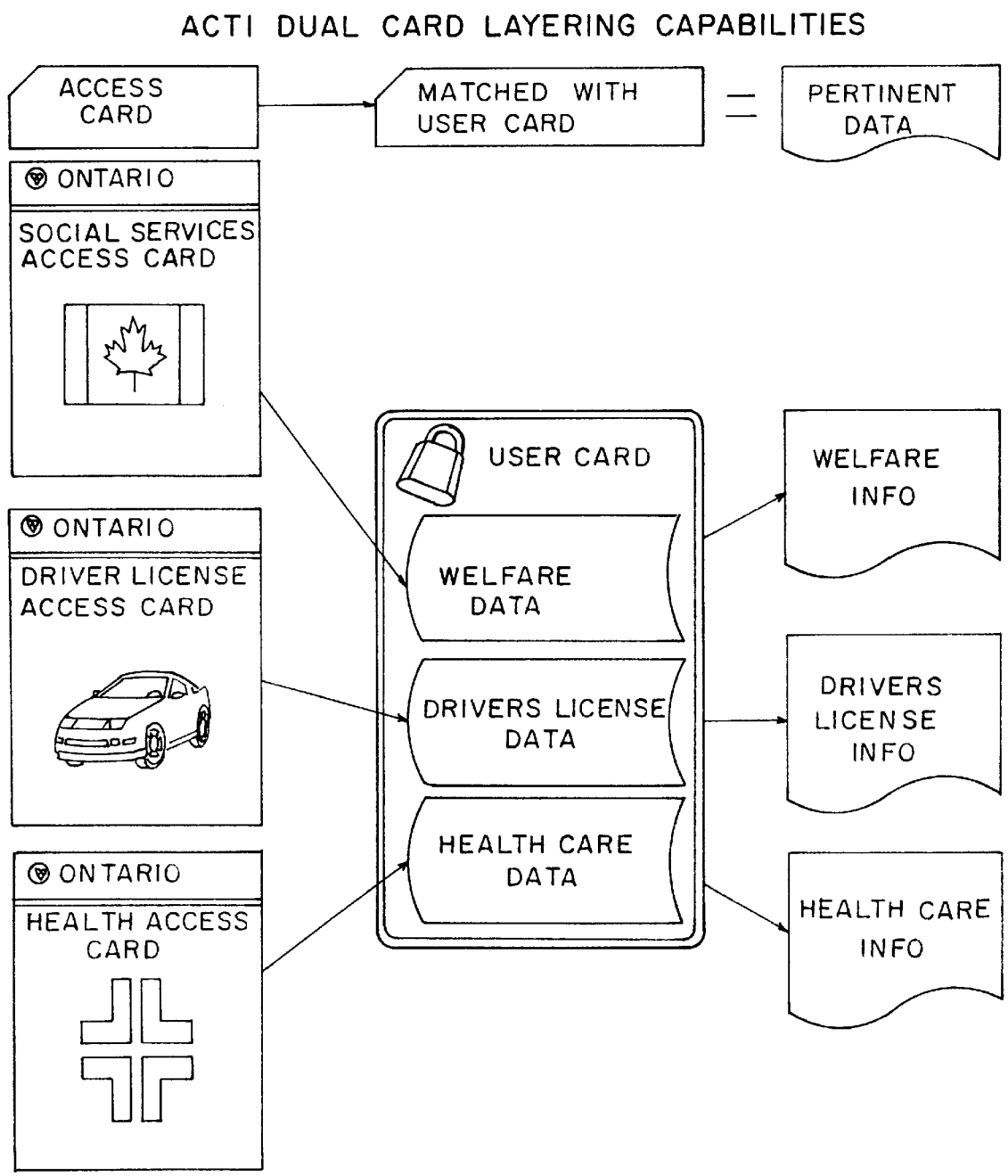
FIG. 13 depicts the multiple data fields layering capability of a dual card system.

FIG. 10 depicts, in graphic form, a dual-card IDENTITY card issue/update station, the updating function being almost identical to issuing IDENTITY cards, except that the depicted system checks that the IDENTITY card has been written to.

The disclosure set forth herein above, with reference to the drawings, and the incorporation by reference to the copyrighted system program, will enable any person skilled in the art to which this invention pertains to assemble and operate the system in accordance with the inventive methods provided herein. It should also be obvious to one skilled in the art that even though communication links/lines 50 and 60 have been depicted as wired lines, various other communication link equivalence could be utilized.

Thus, it is apparent that there has been provided, in accordance with the system invention and methods, an electronic data access and retrieval system and a method of accessing and retrieving digital data information which is applicable to the operation of an electronic secured access verification display system, and that fully satisfies the objectives, aims, and advantages set forth above. It is also further apparent that system operations for issuing IDENTITY cards, ACCESS cards, and dual-card ACCESS or IDENTITY smart card issuing stations have been shown and disclosed.

The following Examples narrate a series of circumstances in which the method and system of the present invention can be utilized.

EXAMPLE 1

A factory employee named Sam working in a manufacturing plant. Sam requires the following data elements on his smart card, which is also his employee identification badge:

Identification Data including photo; biometric data might also be encoded;

Codes Providing Limited Access to Physical Areas within manufacturer's or manufacturing company's facilities;

Money for vending machine use and cafeteria purchases on manufacturer's or manufacturing company's premises; there may also be other uses for money in the manufacturer's or manufacturing company's plant depending on the level of services manufacturer or manufacturing company wants to provide to their employees (e.g., stamp machines, pay phones, etc.); and Health Data including blood type, allergies, chronic maladies, past medical procedures, medications, etc.

The manufacturer or manufacturing company, the system sponsor, wants to allow Sam's card to be used in vending machines for small change purchases, making things easier and quicker for Sam (which, of course, benefits manufacturer or manufacturing company). For this application, the smart card is configured to act as an electronic purse. The manufacturer or manufacturing company arranges for their vending machines to be equipped with smart card readers. The smart card reader installed in the vending machine contains information normally encoded on the Applications Card, thus allowing the User's Card to be used as an electronic purse.

After getting his coffee from the vending machine, Sam spills it and burns himself badly enough to seek medical assistance. Sally, in the nurse's office, uses Sam's card to positively identify that Sam is who he says he is (she puts the card into an access device or reader and immediately sees Sam's face in a picture on her PC screen), that Sam has Type A+ blood and that he's allergic to penicillin. Since Sam also stuck himself with his pencil when he spilled his coffee, Sally can see that he's current with Tetanus vaccine, thereby protecting manufacturer or manufacturing company from some potential future litigation. Sally can access this data because she has the correct Application card. However, Sally cannot see how much money remains on Sam's card, nor can she tell which inventory control areas Sam has access to, nor can she see any personal information required by manufacturer or manufacturing company as particular to Sam's employment.

Later that same day, Sam needs to visit personnel to make changes to his 401K program. Sam's friend Dan works in personnel and uses his Application card to access Sam's personnel file. However, Dan cannot find out that Sam was at Sally's office earlier that day for treatment, nor can Dan find out how much money Sam has left on his card. Likewise, Dan cannot access Sam's card to find out which inventory control areas Sam has access. Too bad, since Dan was wanting to ask Sam whether he could get Dan's wife a customized front grille to her old car.

This scenario repeats itself with every application for which the manufacturer or manufacturing company decides to put their cards to use. Clearly, in our hypothetical case, the manufacturer or manufacturing company has decided to implement this technology because they recognize cost efficiencies, employee convenience, privacy and goodwill. They do not necessarily see a revenue generator for this card, although they may begin to think along the lines of the retailer in our next example. At any rate, even used internally, this card becomes win—win for the system sponsor, card holder and all who interact with the card to make their jobs more productive.

EXAMPLE 2

June is a housewife (meaning she works in the home rather than out of it). She receives a smart card from the grocery chain where she usually shops weekly. The chain is using the card as their frequent shoppers card, check cashing card and as a means of tracking and storing unique purchase items found in June's shopping basket. In this way, the chain can reward June for shopping at their store and provide her with cents off coupons when she buys any product that the chain has decided "qualifies" as unique, no matter at which of the chain's stores June happens to shop.

Each time June visits this particular grocery chain, regardless of the store at which she happens to shop, the clerk asks June for her card at check-out. When the card is inserted into the reader, the list of unique items purchased during June's last two trips are stored in EAR memory, uploaded from the card's secure storage area. The reason the card allows access to this information is that the store's EAR has requested authorization from its host or store controller. Housed in this controller is the Application Card for the chain's loyalty program.

It is important to realize that this same Application Card could have resided at the check-out lane in a second card reader connected to the EAR. As June's card is inserted in the "cardholder's reader", the clerk would insert the Applications Card into this second reader. This would authorize the clerk to view the contents of June's card.

However, due to security reasons and other economic and operating conditions, the chain wanted the Application Card to remain resident at all times. The best way to ensure that condition, the chain reasoned, was to keep the Application Card "centralized" back at the store's controller or chain's host.

As the clerk continues the check-out process, the EAR compares each item bought on June's current trip and compares these with the unique items purchased on June's last trip or last two trips. June receives points for the current trip, cents off on certain items she bought in the current trip, new prize directory (loaded directly onto her chip card so she can view it on her PC later that evening), and other rewards deemed important by the system sponsor.

The applications at work in this example are positive identification of the shopper, immediate reward offered to the shopper based on the bundle of goods in the cart and future reward(s) established based on the goods being purchased on this trip. No other applications may be running on this card eliminating the need for a specific applications or supervisory card. On the other hand, depending on the size of the chain offering such a loyalty program, there may be strategic alliances established that provides for the participation of other merchants or other retail service providers. In turn, this could result in using the application card to prevent one merchant, say, from viewing the shopping patterns of the cardholder at some other merchant's store(s).

While the invention system has been described in conjunction with specific embodiments thereof, it is evident that many alternatives, modifications, variations, and applications will be apparent to those skilled in the art in light of the foregoing description. Accordingly, it is intended to embrace all such alternatives, modifications and variations which fall within the spirit and scope of the appended system and method claims.

What is claimed is:

1. An electronic data access and retrieval system comprising:

at least first and second smart cards, a first card being encoded with at least on digital data field representative of predetermined information and a second card means including authorization codes for enabling access to and authorized retrieval of selected information from said digital data fields of said first card, said second card means being selected from an integrated circuit containing card of PROM or enabled system; and computer means including display means for displaying the accessed data and having at least first and second smart card read/write means operatively connected to said computer means for reading data fields from and writing data fields to said first and second smart cards;

whereby when said first smart card is placed into said first read/write means and said second smart card communicates with second read/write means, access to and authorized retrieval of at least some of the data fields contained in the said first card is enabled and displayed;

wherein said second card means additionally contains at least one digital data field which can be accessed by additional separate second card means.

2. A method of accessing and retrieving digital data information comprising the steps of:

a) encoding a first smart card with a multiplicity of digital data fields representative of predetermined information;

b) encoding a second smart card means or reader capable system with authorization codes for enabling access to and authorized retrieval of selected data field information from said digital data fields of said first card;

c) electronically reading said authorization codes from said second smart card means and retrieving said selected information from at least one of said digital data fields contained in said first smart card; and d) displaying the said selected information;

wherein said second smart card means includes at least one digital data field which can be accessed by yet another second smart card means.

* * * * *

UNITED STATES PATENT AND TRADEMARK OFFICE
CERTIFICATE OF CORRECTION

PATENT NO.    : 5,979,773
DATED         : November 9, 1999
INVENTOR(S)   : Raymond Findley, Jr. and Robert Dixon It is certified that error appears in the above-identified patent and that said Letters Patent is hereby corrected as shown below:

Column 12,
Line 23, "on" should be replaced with -- one --.

Column 12,
Line 29, "of PROM" should be replaced with -- or PROM --.

Signed and Sealed this

Nineteenth Day of August, 2003

JAMES E. ROGAN
*Director of the United States Patent and Trademark Office*